(12) United States Patent
Truelove (10) Patent No.: US 12,045,268 B2
(45) Date of Patent: Jul. 23, 2024

(54) GEOGRAPHIC FILTER FOR DOCUMENTS

(71) Applicant: Microsoft Technology Licensing, LLC, Redmond, WA (US)

(72) Inventor: Benjamin Nicholas Truelove, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/751,202

(22) Filed: May 23, 2022

(65) Prior Publication Data
US 2023/0376510 A1   Nov. 23, 2023

(51) Int. Cl.
  *G06F 16/29*    (2019.01)
  *G06F 16/242*   (2019.01)
  *G06F 16/248*   (2019.01)

(52) U.S. Cl.
  CPC .......... *G06F 16/29* (2019.01); *G06F 16/2428* (2019.01); *G06F 16/248* (2019.01)

(58) Field of Classification Search
  CPC . G06F 16/248; G06F 16/24552; G06F 16/904
  See application file for complete search history.

(56) References Cited

U.S. PATENT DOCUMENTS

| | | | |
|---|---|---|---|
| 7,076,741 B2* | 7/2006 | Miyaki | G01C 21/3682 715/837 |
| 8,898,173 B1* | 11/2014 | Badoiu | G06F 16/9537 707/748 |
| 8,996,305 B2 | 3/2015 | Kesar et al. | |
| 9,665,597 B2 | 5/2017 | Haitani et al. | |
| 10,445,914 B2 | 10/2019 | Ofstad et al. | |
| 2004/0211071 A1* | 10/2004 | Su | G06T 15/40 33/1 AP |
| 2013/0159276 A1* | 6/2013 | Nagaralu | G06F 16/9537 707/E17.014 |
| 2014/0002489 A1 | 1/2014 | Sauder et al. | |
| 2014/0064031 A1* | 3/2014 | Bourgeois | G01S 7/53 367/88 |
| 2014/0297575 A1 | 10/2014 | Rapoport et al. | |

(Continued)

FOREIGN PATENT DOCUMENTS

DE   202014010887 U1   1/2017

OTHER PUBLICATIONS

"Browse photos by location on iPhone", https://web.archive.org/web/20220225070402/https:/support.apple.com/en-in/guide/iphone/iph390138909/ios, Feb. 25, 2022, 3 Pages.

(Continued)

*Primary Examiner* — Yuk Ting Choi
(74) *Attorney, Agent, or Firm* — Schwegman Lundberg & Woessner, P.A.

(57) ABSTRACT

A computer implemented method includes receiving a selection of a cartographic search boundary via a user display interface map, obtaining cartographic candidate boundaries corresponding to stored information files, comparing the cartographic search boundary to the cartographic candidate boundaries, selecting stored information files with cartographic candidate boundaries matching the cartographic search boundary, and displaying representations of selected stored information files.

15 Claims, 4 Drawing Sheets

(56) References Cited

U.S. PATENT DOCUMENTS

| | | | |
|---|---|---|---|
| 2015/0103407 A1* | 4/2015 | Chen | G02B 1/11 |
| | | | 359/601 |
| 2015/0153933 A1 | 6/2015 | Filip et al. | |
| 2018/0082471 A1* | 3/2018 | Rodriguez | G06T 19/20 |
| | | | 707/999.003 |
| 2020/0019285 A1* | 1/2020 | Leahy, Jr. | G09B 29/003 |
| | | | 707/999.003 |
| 2020/0175075 A1* | 6/2020 | Makhija | H04W 4/022 |
| | | | 707/748 |
| 2020/0394662 A1 | 12/2020 | Lester et al. | |
| 2022/0164364 A1* | 5/2022 | Funk | G06F 16/248 |
| | | | 707/748 |

OTHER PUBLICATIONS

Daniyal, Malik, "Google Maps Adds A Sorting Filter In Photos Section—Most Recent Pictures Will Appear First!", Retrieved from: https://www.digitalinformationworld.com/2019/04/google-maps-sorting-filter-latest-photos-and-videos.html, Apr. 3, 2019, 6 Pages.

"International Search Report and Written Opinion issued in PCT Application No. PCT/US23/012976", Mailed Date: May 12, 2023, 10 Pages.

\* cited by examiner

GEOGRAPHIC FILTER FOR DOCUMENTS

BACKGROUND

Map-based searching utilizes location information to identify entities such as businesses or photographs that are within a desired radius of a user or specified location or within a drawn boundary. The businesses and photographs may have associated metadata containing geospatial coordinates that are compared to the specified location to determine a distance or determine if they are within the drawn boundary. Some methods use the distance to filter out entities outside the desired radius. This method of identifying entities is fairly primitive and requires the entities to have location metadata.

SUMMARY

A computer implemented method includes receiving a selection of a cartographic search boundary via a user display interface map, obtaining cartographic candidate boundaries corresponding to stored information files, comparing the cartographic search boundary to the cartographic candidate boundaries, selecting stored information files with cartographic candidate boundaries matching the cartographic search boundary, and displaying representations of selected stored information files.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software in one embodiment. The software may consist of computer executable instructions stored on computer readable media or computer readable storage device such as one or more non-transitory memories or other type of hardware-based storage devices, either local or networked. Further, such functions correspond to modules, which may be software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system, turning such computer system into a specifically programmed machine.

The functionality can be configured to perform an operation using, for instance, software, hardware, firmware, or the like. For example, the phrase "configured to" can refer to a logic circuit structure of a hardware element that is to implement the associated functionality. The phrase "configured to" can also refer to a logic circuit structure of a hardware element that is to implement the coding design of associated functionality of firmware or software. The term "module" refers to a structural element that can be implemented using any suitable hardware (e.g., a processor, among others), software (e.g., an application, among others), firmware, or any combination of hardware, software, and firmware. The term, "logic" encompasses any functionality for performing a task. For instance, each operation illustrated in the flowcharts corresponds to logic for performing that operation. An operation can be performed using, software, hardware, firmware, or the like. The terms, "component," "system," and the like may refer to computer-related entities, hardware, and software in execution, firmware, or combination thereof. A component may be a process running on a processor, an object, an executable, a program, a function, a subroutine, a computer, or a combination of software and hardware. The term, "processor," may refer to a hardware component, such as a processing unit of a computer system.

Furthermore, the claimed subject matter may be implemented as a method, apparatus, or article of manufacture using standard programming and engineering techniques to produce software, firmware, hardware, or any combination thereof to control a computing device to implement the disclosed subject matter. The term, "article of manufacture," as used herein is intended to encompass a computer program accessible from any computer-readable storage device or media. Computer-readable storage media can include, but are not limited to, magnetic storage devices, e.g., hard disk, floppy disk, magnetic strips, optical disk, compact disk (CD), digital versatile disk (DVD), smart cards, flash memory devices, among others. In contrast, computer-readable media, i.e., not storage media, may additionally include communication media such as transmission media for wireless signals and the like.

Prior map-based searching utilizes location information to identify entities, such as businesses or photographs, that are within a desired radius of a user or specified location. Distance is used to remove entities outside the desired radius or drawn boundary. The use of distance to specify a search area is limiting and does not provide flexibility in limiting searches to geographic areas that are not circular in nature. The results of the search are also limited to comparing specific addresses associated with entity metadata to a distance from a center or boundary of a search area.

An improved geographic search provides an ability to specify a flexible cartographic search boundary and identify information files that have associated cartographic candidate boundaries matching the cartographic search boundary. The use of the cartographic search boundary provides a graphical mechanism for searching for information files. The use of cartographic candidate boundaries for or derived from information in the information files provides the ability to search based on geographical affinity of the information files to the search boundary. The candidate boundaries may be based on geographic metadata associated with the information files or derived from information within the information files.

While photographs commonly have location metadata and are easy to identify relative to a location, other types of files, such as documents, spreadsheets, and presentations may not commonly have associated metadata files with location information. However, these other type of files may include information within the file, as opposed to within metadata associated with the file, corresponding to a location. Such information in the file may include addresses and descriptions of entities whose locations can be determined. The files themselves can be searched while performing a geographic search to obtain the location determining information, referred to as cartographic information from which cartographic candidate boundaries may be determined. In further examples, metadata derived from the information in the files may be generated prior to searching and used during the search to facilitate the graphical search.

Figure 1:
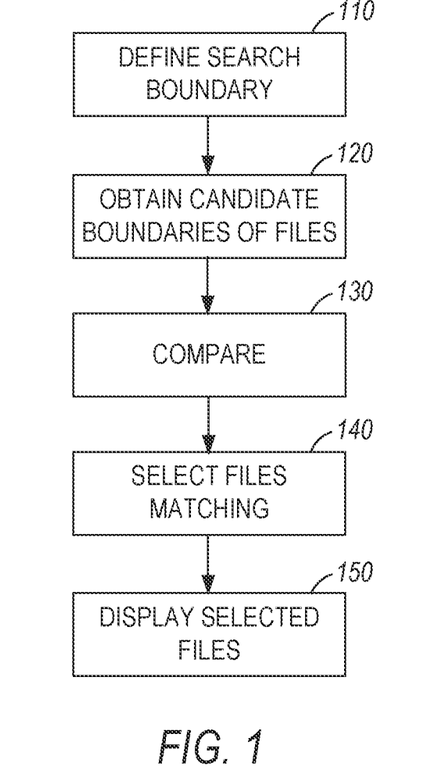
FIG. 1 is a flowchart of a computer implemented method of utilizing cartographic boundaries to identify information files according to an example embodiment.

FIG. 1 is a flowchart of a computer implemented method 100 of utilizing cartographic boundaries to identify information files. Method 100 begins at operation 110 by receiving a selection of a cartographic search boundary via a user display interface map. The cartographic search boundary may be a perimeter drawn freehand on the map or specified as a radius from a point on the map. In further examples, the cartographic search boundary may be identified by specifying locations with known boundaries, such as a park, district, neighborhood, town, city, or other entity that has an associated boundary, such a property boundary associated with an address.

The search boundary, also referred to as a perimeter, may be a circle, oval, polygon or other meandering shape and may be manipulated by dragging, resizing, or otherwise edited. In one example, the search boundary may be generated from addresses in a specified contact list, with the search boundary drawn to encompass all addresses or even to exclude outliers outside a specified threshold distance from a specified center within the boundary.

Cartographic candidate boundaries corresponding to stored information files are obtained at operation 120. Cartographic information from which candidate boundaries may be determined, may be included in metadata of the stored information files or derived from information within the files, such as address information or points of interest described within the files. Locations of businesses and areas having associated locations may be used to identify the cartographic information. The candidate boundaries have an area greater than zero, and may be defined by a series of latitude and longitude points defining a triangle mesh in one example.

The cartographic search boundaries are compared at operation 130 to the cartographic candidate boundaries. As noted above, the candidate boundaries may be represented by candidate triangle meshes which may be compared using graphics processors to the search boundaries that are represented in the same manner to determine an amount of overlap or intersection.

Stored information files with cartographic candidate boundaries matching the cartographic search boundary are selected at operation 140. Matching in one example comprises determining a ratio of overlapping area of each result boundary with the search boundary. In a further example, comparing and matching the cartographic search boundary to the cartographic candidate boundaries includes identifying elements in an information file referencing entities that are within the search boundary. The more elements found, the greater the affinity. A threshold number of such elements may be used to perform the match, or all information files having matching elements may be selected and ranked based on the number of matching elements. A maximum number of information files may be specified to limit the number of files selected as matching.

Operation 150 displays representations of the selected stored information files. The representations may be results displayed on a map as icons within or outside the cartographic search boundary and may also include a list ranked based on affinity. The affinity may be based on a percentage of intersection of search boundary with each result boundary or based on a closest to a geometric center of search boundary or weighted combination of both. Icons may be displayed on the map positioned at the geometric center of the corresponding candidate boundary or at an associated address. The list may include file names with or without icons and may be color coded based on affinity.

In one example, obtaining cartographic candidate boundaries at operation 120 includes extracting cartographic information from the stored information files and generating the corresponding cartographic result boundaries from the extracted cartographic information. The cartographic information extracted from the files may include an address. The corresponding result boundary comprises a perimeter of property corresponding to the address.

In another example, the extracted cartographic information may include a location with a known boundary, referred to as a designated entity. The corresponding candidate boundary comprises a perimeter of the designated entity.

In one example a number of cartographic candidate boundaries obtained at operation 120 may be limited to a particular storage location, such as a folder or storage area of cloud-based storage containing information files. Boolean searches may be applied to limit the search space.

There are various practical applications that may utilize the improved geographic searching. In one example, a restaurant may aggregate calls for delivery in a spreadsheet type of information file. The addresses in the information file associated with the calls may be used to determine a search boundary that encompasses the corresponding candidate boundaries corresponding to the addresses. That search boundary may be used as a filter for identifying candidate customers living within the search boundary by searching a database of dwellings.

Figure 2:
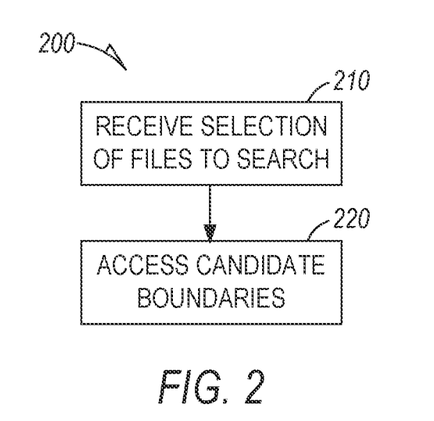
FIG. 2 is a flowchart of a computer implemented method of obtaining cartographic candidate boundaries corresponding to stored information files according to an example embodiment.

FIG. 2 is a flowchart of a computer implemented method 200 of obtaining cartographic candidate boundaries corresponding to stored information files. Method 200 begins at operation 210 by receiving a selection of information files to search. The selection may be based on a query that is applied to the stored information files to select the files. At operation 220, cartographic candidate boundaries are accessed from the selection of information files or derived from information in the information files, such as addresses, references to locations, parks, cities, districts, or any other information from which a candidate boundary can be derived.

Figure 3:
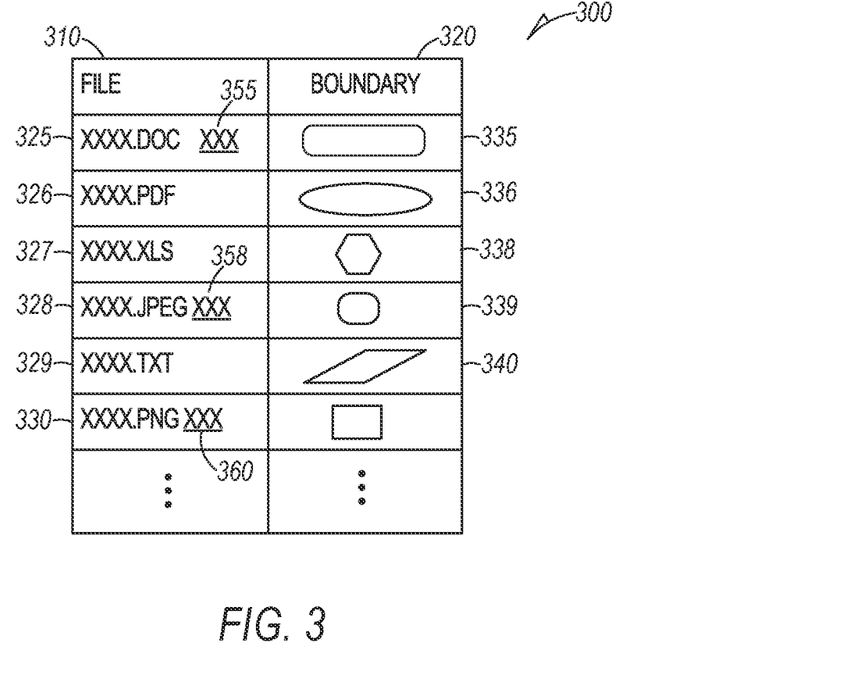
FIG. 3 is a chart illustrating file names and corresponding boundaries according to an example embodiment.

FIG. 3 is a chart 300 illustrating file names in column 310 and corresponding boundaries in column 320. Example file names may include documents, spreadsheets, images, videos, and other types of files containing information. File types of DOC, PDF, XLS, JPEG, TXT, and PNG are shown at 325, 326, 327, 328, 329, and 330 respectively. Corresponding candidate boundaries are shown at 335, 336, 337, 338, 339, and 340. The boundaries are shown as perimeters forming varies shapes, from polygons to circles. The boundaries may be derived from information within the corresponding files in one example, or from metadata previously extracted and stored with the files. Such extracted metadata is shown at 355 for file 325, 358 for file 328, and at 360 for file 330. Such extracted metadata may be generated from text within the file, such as a document file indicated at 325. Image data in files 328 and 330 may be processed using object recognition and optical character recognition on any characters that may be included in the image data to identify landmarks, with boundary information derived and provided in their corresponding metadata at 358 and 360 along with location information of where the image was taken.

Figure 4:
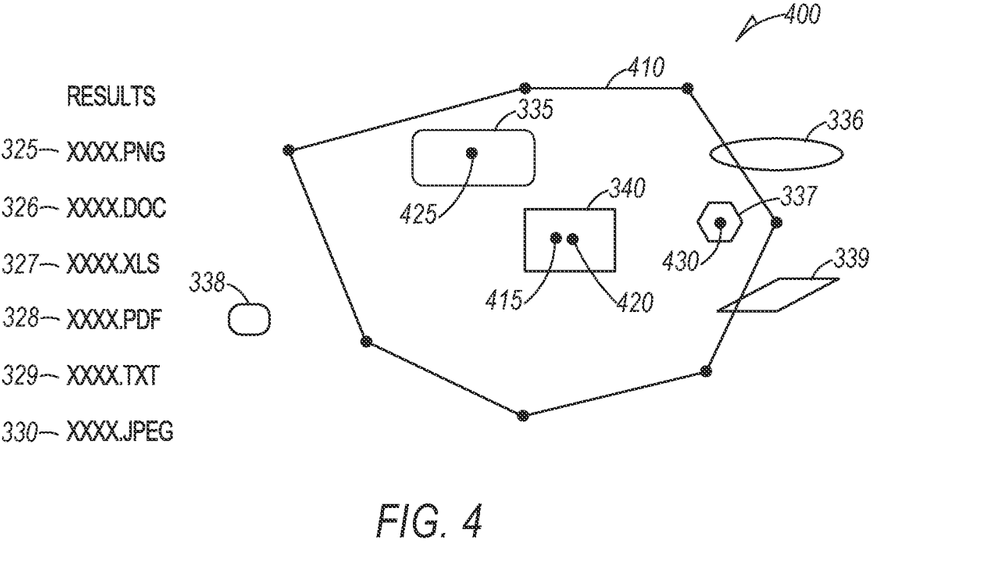
FIG. 4 is a cartographic representation of boundaries according to an example embodiment.

FIG. 4 is a cartographic representation of boundaries indicated generally at 400. This representation may be displayed as an output in one example with a cartographic background identifying streets and other points of interest. The cartographic background may alternatively include satellite images or other visual representations commonly displayed in mapping applications.

A cartographic search boundary 410 is shown with candidate boundaries from FIG. 3 superimposed or overlaid on top of the search boundary 410. A geometric center 415 of the search boundary 410 is also identified and is within the search boundary as illustrated. It is also possible that the geometric center may be outside of the search boundary for some search boundaries.

Candidate boundaries 335, 337, and 340 are shown as being within the search boundary 410. Since the search boundary 410 completely overlaps each of the candidate boundaries 335, 337, and 340, these candidate boundaries will be ranked higher than candidate boundaries 336 and 339, which partially overlap the search boundary 410. Candidate boundary 338 lies completely outside the search boundary and will be ranked lowest.

Candidate boundary 340 has a geometric center 420, which is very close to the search boundary geometric center 415. The other candidate boundaries 335 and 337 have geometric centers 425 and 430 respectively, that are further from the search boundary geometric center 415 and will be ranked lower. A list of ranked results 440 may also be displayed by file name.

In the example shown at 400, the candidate files are ranked by candidate boundary geometric center distance from the geometric center of the search boundary 410.

In further examples, the percentage of overlap may be used. In a percentage of overlap ranking, boundaries 335 and 340 appear to have the most area within the search boundary 410 and would be ranked highest. A weighted combination of geometric center distance and percentage overlap may be used in further examples. Each example may also first prioritize those candidate boundaries subsumed within the search boundary, ranking those first and then adding in others not so subsumed.

Figure 5:
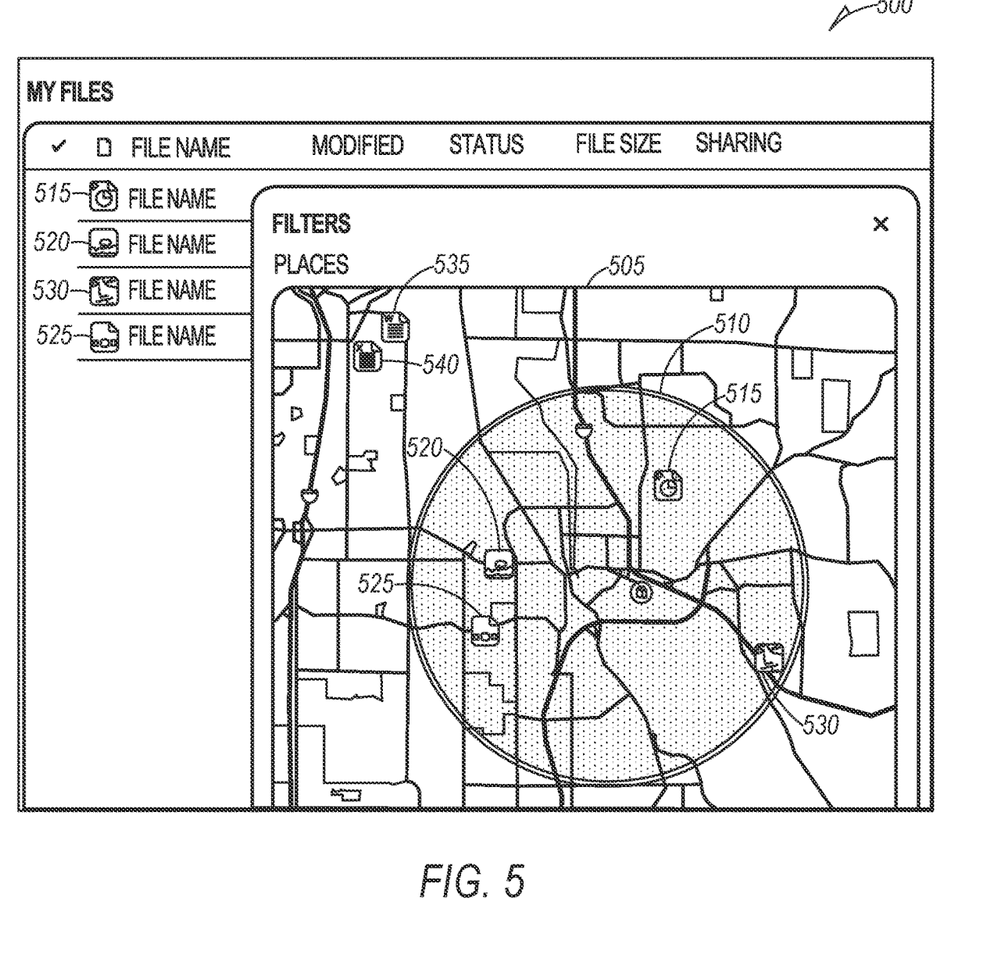
FIG. 5 is an illustration of results of a cartographic boundary based search according to an example embodiment.

FIG. 5 is an illustration of results 500 of a cartographic boundary based search. A map 505 is shown illustrating roads and points of interest around Redmond, Washington, USA. A simple search boundary 510 is shown as a circle around Redmond. In various embodiments, a user may move the search boundary 510 by using a cursor to grab the circle and move or resize the search boundary as desired. Search results for the search boundary 510 as illustrated are shown on the map 505 as icons at 515, 520, 525, 530, 535, and 540 representative of the corresponding file types in one example. Icon 515 corresponds to presentation file, icon 520 and 530 correspond to image files, icon 525 corresponds to a PDF file, icon 535 corresponds to a document file, and icon 540 corresponds to a spreadsheet file. The icons may be placed on the map 505 corresponding to their respective geometric centers or a street address of an entity identified from the cartographic information associated with the file. Icons 335 and 340 are shown outside the search area 510.

In one example, the results 500 may include a list 545 of the file names with corresponding icons having the same reference numbers as the icons on the map 505. In this example, only the icons and file names within the search boundary 510 are included in the list 545. In further examples, icons 535 and 540 may also be included in the list 545. The icons may be linked to the files to open the files using selected applications. The icons in the list may alternatively be used to open the files with the icons on the map useable to show the corresponding candidate boundary or even zoom in on the candidate boundary. The map 505 may also be zoomable.

Figure 6:
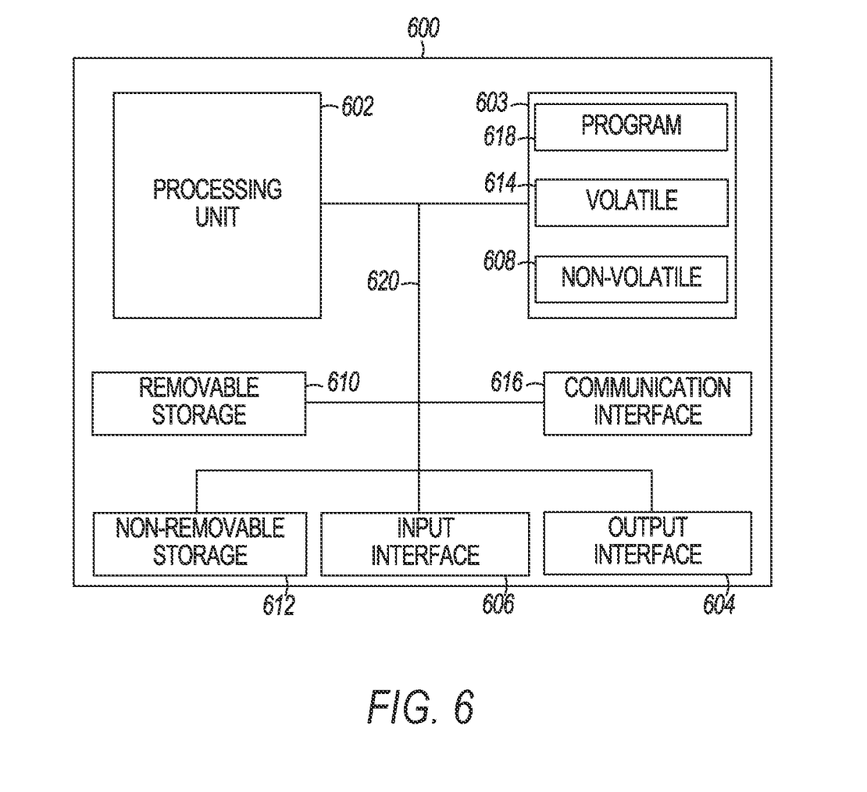
FIG. 6 is a block schematic diagram of a computer system to implement one or more example embodiments.

FIG. 6 is a block schematic diagram of a computer system 600 to perform boundary based geographic based searching and for performing methods and algorithms according to example embodiments. All components need not be used in various embodiments.

One example computing device in the form of a computer 600 may include a processing unit 602, memory 603, removable storage 610, and non-removable storage 612. Although the example computing device is illustrated and described as computer 600, the computing device may be in different forms in different embodiments. For example, the computing device may instead be a smartphone, a tablet, smartwatch, smart storage device (SSD), or other computing device including the same or similar elements as illustrated and described with regard to FIG. 6. Devices, such as smartphones, tablets, and smartwatches, are generally collectively referred to as mobile devices or user equipment.

Although the various data storage elements are illustrated as part of the computer 600, the storage may also or alternatively include cloud-based storage accessible via a network, such as the Internet or server-based storage. Note also that an SSD may include a processor on which the parser may be run, allowing transfer of parsed, filtered data through I/O channels between the SSD and main memory.

Memory 603 may include volatile memory 614 and non-volatile memory 608. Computer 600 may include—or have access to a computing environment that includes—a variety of computer-readable media, such as volatile memory 614 and non-volatile memory 608, removable storage 610 and non-removable storage 612. Computer storage includes random access memory (RAM), read only memory (ROM), erasable programmable read-only memory (EPROM) or electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

Computer 600 may include or have access to a computing environment that includes input interface 606, output interface 604, and a communication interface 616. Output interface 604 may include a display device, such as a touchscreen, that also may serve as an input device. The input interface 606 may include one or more of a touchscreen, touchpad, mouse, keyboard, camera, one or more device-specific buttons, one or more sensors integrated within or coupled via wired or wireless data connections to the computer 600, and other input devices. The computer may operate in a networked environment using a communication connection to connect to one or more remote computers, such as database servers. The remote computer may include a personal computer (PC), server, router, network PC, a peer device or other common data flow network switch, or the like. The communication connection may include a Local Area Network (LAN), a Wide Area Network (WAN), cellular, Wi-Fi, Bluetooth, or other networks. According to one embodiment, the various components of computer 600 are connected with a system bus 620.

Computer-readable instructions stored on a computer-readable medium are executable by the processing unit 602 of the computer 600, such as a program 618. The program 618 in some embodiments comprises software to implement one or more methods described herein. A hard drive, CD-ROM, and RAM are some examples of articles including a non-transitory computer-readable medium such as a storage device. The terms computer-readable medium, machine readable medium, and storage device do not include carrier waves or signals to the extent carrier waves and signals are deemed too transitory. Storage can also include networked storage, such as a storage area network (SAN). Computer program 618 along with the workspace manager 622 may be used to cause processing unit 602 to perform one or more methods or algorithms described herein.

Examples

1. A computer implemented method includes receiving a selection of a cartographic search boundary via a user display interface map, obtaining cartographic candidate boundaries corresponding to stored information files, comparing the cartographic search boundary to the cartographic candidate boundaries, selecting stored information files with cartographic candidate boundaries matching the cartographic search boundary, and displaying representations of selected stored information files.

2. The method of example 1 wherein obtaining cartographic candidate boundaries includes extracting cartographic information from the stored information files and generating the corresponding cartographic candidate boundaries from the extracted cartographic information.

3. The method of example 2 wherein the cartographic information includes an address, and wherein the candidate boundary comprises a perimeter of property corresponding to the address.

4. The method of example 2 wherein the cartographic information includes a designated entity having a known boundary.

5. The method of example 2 wherein the cartographic information includes metadata of the stored information files.

6. The method of example 1 wherein matching includes determining a ratio of overlapping area of each candidate boundary with the search boundary.

7. The method of example 1 wherein the cartographic search boundary includes a user drawn perimeter on a displayed map.

8. The method of example 1 wherein the cartographic search boundary includes a polygon.

9. The method of example 1 wherein obtaining cartographic candidate boundaries corresponding to stored information files includes receiving a selection of information files to search and accessing the cartographic candidate boundaries from the selection of information files.

10. The method of example 9 wherein receiving a selection of information files to search includes receiving a query and applying the query to stored information files to select the information files to search.

11. The method of example 1 wherein displaying representations of selected stored information files includes generating a list of the selected stored information files in order of boundary affinity.

12. The method of example 11 wherein boundary affinity is calculated as a percentage of intersection of the boundaries.

13. The method of example 11 wherein boundary affinity is calculated as a function of distance between geometric centers of the boundaries.

14. The method of example 1 wherein displaying representations of selected stored information files includes displaying an icon positioned at a geocentric center of its corresponding boundary on the map.

15. A machine-readable storage device has instructions for execution by a processor of a machine to cause the processor to perform operations to perform any of the methods of examples 1-14.

20. A device includes a processor and a memory device coupled to the processor and having a program stored thereon for execution by the processor to perform operations to perform any of the methods of examples 1-14.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

The invention claimed is:

1. A computer implemented method comprising:
receiving a selection of a cartographic search boundary comprising a user drawn perimeter via a user display interface map;
obtaining first stored information files;
obtaining cartographic candidate boundaries from the first stored information files;
comparing the cartographic search boundary to the cartographic candidate boundaries;
obtaining second stored information files, the second stored information files being associated with an application where the stored information files include user created cartographic information generated with the application;
searching the second stored information files for data based on the cartographic candidate boundaries;
selecting ones of the second stored information files with cartographic candidate boundaries matching the cartographic search boundary, wherein the matching comprises:
determining a percentage of overlap between each cartographic candidate boundary and the cartographic search boundary;
determining a distance between a geometric center of each cartographic candidate boundary of the cartographic candidate boundaries and the cartographic search boundary;
weighting a combination of the percentage overlap and the distance between the geometric center of each cartographic candidate boundary of the cartographic candidate boundaries and the cartographic search boundary; and displaying representations of the selected ones of the second stored information files, wherein displaying representations of the selected ones of the second stored information files comprises generating a list of the selected ones of the second stored information files in order of boundary affinity, the list including a ranking based on the weighted combination.

2. The method of claim 1 wherein obtaining cartographic candidate boundaries comprises:
  extracting cartographic information from the selected ones of the second stored information files; and
  generating corresponding cartographic candidate boundaries from the extracted cartographic information.

3. The method of claim 2 wherein the cartographic information comprises an address, and wherein the candidate boundary comprises a perimeter of property corresponding to the address.

4. The method of claim 2 wherein the cartographic information comprises a designated entity having a known boundary.

5. The method of claim 2 wherein the cartographic information comprises metadata of the second stored information files.

6. The method of claim 1 wherein the cartographic search boundary comprises a polygon.

7. The method of claim 1 wherein obtaining cartographic candidate boundaries from the first stored information files:
  receiving a selection of information files to search; and
  accessing the cartographic candidate boundaries from the selection of information files.

8. The method of claim 7 wherein receiving a selection of information files to search comprises:
  receiving a query; and
  applying the query to stored information files to select the information files to search.

9. The method of claim 1 wherein boundary affinity is calculated as a percentage of intersection of the boundaries.

10. The method of claim 1 wherein displaying representations of the selected ones of the second stored information files comprises displaying an icon positioned at a geocentric center of its corresponding boundary on the map.

11. A non-transitory machine-readable storage medium comprising instructions for execution by a processor of a machine to cause the processor to perform operations to perform a method, the operations comprising:
  receiving a selection of a cartographic search boundary comprising a user drawn perimeter via a user display interface map;
  obtaining first stored information files;
  obtaining cartographic candidate boundaries from the first stored information files;
  comparing the cartographic search boundary to the cartographic candidate boundaries;
  obtaining second stored information files, the second stored information files being associated with an application where the stored information files include user created cartographic information generated with the application;
  searching the second stored information files for data based on the cartographic candidate boundaries;
  selecting ones of the second stored information files with cartographic candidate boundaries matching the cartographic search boundary, wherein the matching comprises:
    determining a percentage of overlap between each cartographic candidate boundary and the cartographic search boundary;
    determining a distance between a geometric center of each cartographic candidate boundary of the cartographic candidate boundaries and the cartographic search boundary;
    weighting a combination of the percentage overlap and the distance between the geometric center of each cartographic candidate boundary of the cartographic candidate boundaries and the cartographic search boundary; and
  displaying representations of the selected ones of the second stored information files, wherein displaying representations of the selected ones of the second stored information files comprises generating a list of the selected ones of the second stored information files in order of boundary affinity, the list including a ranking based on the weighted combination.

12. The non-transitory machine-readable storage medium of claim 11 wherein obtaining cartographic candidate boundaries comprises:
  extracting cartographic information from the selected ones of the second stored information files; and
  generating corresponding cartographic candidate boundaries from the extracted cartographic information.

13. The non-transitory machine-readable storage medium of claim 11 wherein obtaining cartographic candidate boundaries from the first stored information files:
  receiving a selection of information files to search; and
  accessing the cartographic candidate boundaries from the selection of information files.

14. The non-transitory machine-readable storage medium of claim 13 wherein receiving a selection of information files to search comprises:
  receiving a query; and
  applying the query to stored information files to select the information files to search.

15. A device comprising:
  a processor; and
  a memory device coupled to the processor and having a program stored thereon for execution by the processor to perform operations comprising:
    receiving a selection of a cartographic search boundary comprising a user drawn perimeter via a user display interface map;
    obtaining first stored information files;
    obtaining cartographic candidate boundaries from the first stored information files;
    comparing the cartographic search boundary to the cartographic candidate boundaries;
    obtaining second stored information files, the second stored information files being associated with an application where the stored information files include user created cartographic information generated with the application;
    searching the second stored information files for data based on the cartographic candidate boundaries;
    selecting ones of the second stored information files with cartographic candidate boundaries matching the cartographic search boundary, wherein the matching comprises:
      determining a percentage of overlap between each cartographic candidate boundary and the cartographic search boundary;
      determining a distance between a geometric center of each cartographic candidate boundary of the cartographic candidate boundaries and the cartographic search boundary;

weighting a combination of the percentage overlap and the distance between the geometric center of each cartographic candidate boundary of the cartographic candidate boundaries and the cartographic search boundary; and displaying representations of the selected ones of the second stored information files, wherein displaying representations of the selected ones of the second stored information files comprises generating a list of the selected ones of the second stored information files in order of boundary affinity, the list including a ranking based on the weighted combination.

\* \* \* \* \*